United States Patent [19]

Rubbmark et al.

[11] Patent Number: 6,012,105

[45] Date of Patent: Jan. 4, 2000

[54] SYSTEM FOR INTERFACING WITH AN EXTERNAL ACCESSORY IN ONE OF TWO INTERFACE MODES BASED ON WHETHER COMMUNICATION CAN BE ESTABLISHED WITH EXTERNAL ACCESSORY OR NOT

[75] Inventors: Jan Rubbmark, Malmö ; Jan Lind, Bjärred; Lars Engelin, Södra, all of Sweden

[73] Assignee: Telefonaktiebolaget L M Ericsson, Stockholm, Sweden

[21] Appl. No.: 08/848,910

[22] Filed: May 1, 1997

[51] Int. Cl.[7] ........................................ G06F 13/00
[52] U.S. Cl. ................................................ 710/14
[58] Field of Search ........................... 375/222; 710/105, 710/8, 73, 10, 14; 711/102

[56] References Cited

U.S. PATENT DOCUMENTS

| | | | |
|---|---|---|---|
| 4,654,655 | 3/1987 | Kowalski | 340/825.5 |
| 5,202,899 | 4/1993 | Walsh | 375/222 |
| 5,452,420 | 9/1995 | Engdahl et al. | 710/105 |
| 5,598,577 | 1/1997 | Overfield | 710/10 |
| 5,634,074 | 5/1997 | Devon et al. | 710/8 |
| 5,664,231 | 9/1997 | Postman et al. | 710/73 |
| 5,802,550 | 9/1998 | Fullam et al. | 711/102 |

FOREIGN PATENT DOCUMENTS 0 655 873  5/1995  European Pat. Off. .

OTHER PUBLICATIONS

IBM TDB, "Remote Modem—Type Self–Learning", Nov. 1985, pp. 2398–2399.

The I$^2$C–bus Benefits Designers and Manufacturers, Phillips Semiconductors, Apr. 1995.

"Accessory Detection by Oscillation", Motorola Technical Developments, vol. 28, Aug. 1996, pp. 86–88.

*Primary Examiner*—Albert De Cady
*Assistant Examiner*—David Ton
*Attorney, Agent, or Firm*—Burns, Doane, Swecker & Mathis, L.L.P.

[57] ABSTRACT

An electronic device operates with an external accessory by initiating a serial data communication over an accessory control bus. If data communication is established with the external accessory, the electronic device operates in a first interface mode, when one or more operating parameters are transferred over the bus. If data communication is not established, the electronic device operates in a second interface mode, when no operating parameters are transferred over the bus.

24 Claims, 3 Drawing Sheets

SYSTEM FOR INTERFACING WITH AN EXTERNAL ACCESSORY IN ONE OF TWO INTERFACE MODES BASED ON WHETHER COMMUNICATION CAN BE ESTABLISHED WITH EXTERNAL ACCESSORY OR NOT

BACKGROUND

This invention generally relates to the field of electronic devices that incorporate an accessory control bus interface and, more particularly, to a method and apparatus for operating these devices with various types of external accessories, including accessories that do not include compatible bus interfaces.

In order to add complementary features and functionality, many consumer, telecommunication and industrial electronic devices interface with external accessories through suitable accessory ports. When the accessory device and the electronic device are connected, their complementary accessory connectors engage to form corresponding electrical interconnections for accessory signals. For example, a portable wireless phone can be attached to a suitably formed cradle of a hands-free external accessory, to facilitate the operation of the phone from inside an automobile. Usually, the mobile hands-free device includes audio circuitry for amplifying the audio heard in the automobile and other circuitry for routing voice signals from the automobile into the phone. Another version of the hands-free external accessory is a less complicated portable hands-free accessory that includes a small speaker and a microphone. When the portable hands-free accessory is worn by the user, the speaker and microphone are positioned close to the user's ear and mouth, respectively. In this way, portable hands-free accessory allows a user to operate the phone without holding it in his or her hands. Another popular accessory for the phone is a battery charger, which may be incorporated into the mobile hands-free accessory, to charge the phone's battery.

When operating with an external accessory, the electronic device may be required to adjust its operating parameters. For example, when operating with the portable hands-free accessory, the phone increases the audio output power provided at the accessory port, to accommodate the portable hands-free accessory. Accordingly, most electronic devices are equipped with sensing circuitry that sense presence or absence of the external accessories.

Many conventional sensing circuits of electronic devices sense a predefined electrical condition that is created on the accessory port, when the external accessory is present. Some external accessories present a predefined binary state (a high or a low state) to indicate their presence. Alternatively, external accessories may present an electrical parameter, such as an impedance, on the accessory port, that enables the electronic device to distinguish between various types of external accessories. By sensing a particular impedance, which may be represented by a voltage potential at the accessory port, the electronic device can determine the type of the attached external accessory.

With the advances in technology, the electronic devices and their accessories are becoming more and more complicated. Often, the more advanced electronic devices incorporate intelligent micro-controllers for controlling various functions such as driving displays and input/output ports, etc. To keep up with these advances, the manufacturers are equipping the external accessories with intelligent controllers as well. Consequently, there has been a need to communicate more complicated operating parameters between the electronic device and their external accessories. In these cases, the operation of the electronic device and the external accessory may require the repeated communication of one or more dynamically changing operating parameters based on which the operation of the electronic device and/or its accessory may be adjusted, to achieve or improve a particular function. For example, when crossing from one communication cell into another, the phone may transmit to the mobile hands-free external accessory a hand-over parameter along with audio parameters that correspond to the operating environment of the new cell. By taking into account the operating parameters of the new cell, the mobile hands-free device can adjust the parameters of its echo-canceling circuitry, to provide better audio quality inside the automobile.

Some of the more advanced electronic devices and accessories use an accessory control bus (ACB) for transferring operating parameters with each other. One such ACB interface is the $I^2C$-bus interface, which is developed by Phillips Corp. The specification and functionality of the $I^2C$-Bus interface is described in detail in a Phillips Semiconductors' publication, titled: The $I^2C$-bus and how to use it (including specifications), April 1995, which is hereby incorporated by reference. Over a two-line serial bus, the ACB devices that incorporate the $I^2C$ interface can transfer a wide variety of complex operating parameters at rates of up to 400 kbits/sec.

Often times, however, it is required to provide interoperablity between ACB devices and non-ACB devices. For example, an ACB device, which is equipped with the $I^2C$ bus interface, is sometimes required to operate with a simple non-ACB accessory that does not incorporate the $I^2C$ interface. Conversely, an ACB accessory equipped with the $I^2C$ functionality may be required to interface with a non-ACB device. Conventionally, approaches to interoperability involve complex modifications to the ACB, or the non-ACB devices. These modifications often increase the cost of providing the interoperability. Therefore, there exists a need for a simple method and apparatus for providing interoperability between the ACB and non-ACB devices.

SUMMARY

Briefly, the present invention that addresses this need is incorporated in an electronic device and a method of operating the electronic device that changes the interface mode of the electronic device based on the interface type of an attached external device. The electronic device has a port for interfacing with the external device through an interface bus and a bus control interface that initiates data communication over the interface bus. A controller operates the electronic device in a first interface mode, if data communication is established with the external device, and in a second interface mode, if data communication is not established with the external device. In the first interface mode, the electronic device and the external device can transfer at least one operating parameter over the interface bus, and in the second interface mode, no operating parameter is transferred over the interface bus. In this case, the electronic device may use a default operating parameter, when operating in the second interface mode.

In some of the exemplary features of the invention, the bus control interface initiates serial communication over the interface bus, and detects a transition from a first binary state to a second binary state for determining whether data communication is established. When no transition is detected after a time-out period, the electronic device determines that data communication is not established. In another aspect of the invention, the bus control interface initiates data communication in response to a signal transition on the port, when the external device is attached to the electronic device.

In yet another aspect of the invention, the bus interface initiates data communication using at least two different data transfer rates, and determines whether data communication is established at each one of the different data transfer rates. The controller may also operate the electronic device in the first mode, to transfer a predefined operating parameter over the interface bus. Then, it operates the electronic device in the second interface mode, when no operating parameter is transferred.

A method of operating the electronic device according to the present invention includes initiating data communication with the external device through the port. Then, determining whether data communication is established with the external device. If data communication is established, transferring an operating parameter between the electronic device and the external device through the port. Otherwise, transferring no operating parameter between the electronic device and the external device.

Other features and advantages of the present invention will become apparent from the following description of the preferred embodiment, taken in conjunction with the accompanying drawings, which illustrate, by way of example, the principles of the invention.

DETAILED DESCRIPTION

Figure 1:
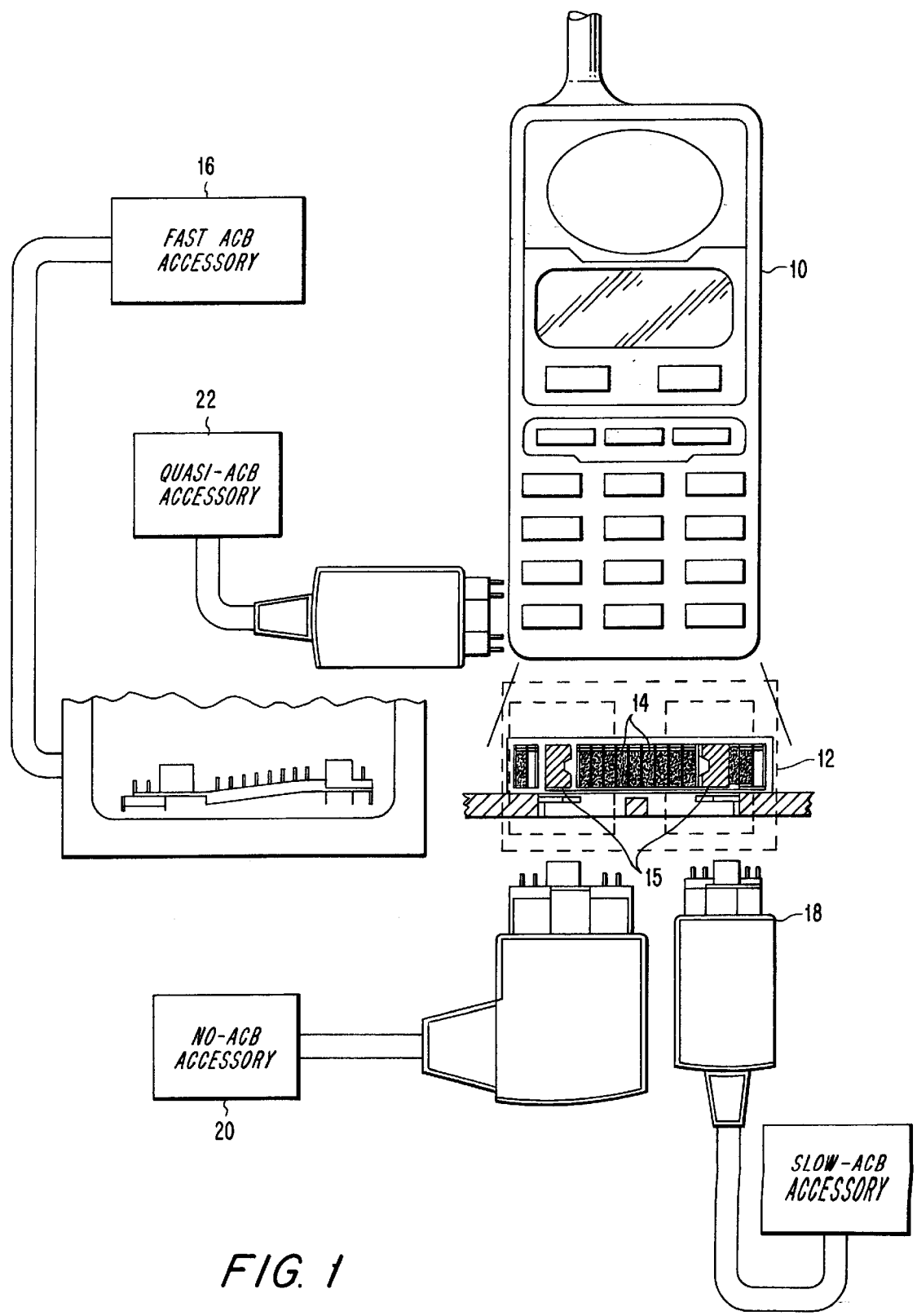
FIG. 1 is a diagram of an electronic device and the various external accessories that can operate with the electronic device according to the present invention.

With reference to FIG. 1, a cellular phone 10 is shown as an exemplary electronic device that operates according to the present invention. At its bottom, the phone 10 includes an accessory port 12 for interfacing with various types of external accessories according to the present invention. The phone 10 operates in a well known manner within a cellular communication system, to provide two-way voice and data communication within a coverage area. An exemplary phone 10 that can advantageously incorporate the method and apparatus for operating with an external accessory according to the present invention is a AF-738 or GF-788 portable products, which are offered by Telefonaktiebolaget L M Ericsson, the assignee of the present invention. The accessory port 12, includes a number of accessory pins 14 and spring loaded latches 15. The pins 14 and latches 15 engage with corresponding contact pins and latches of an external accessory, when the external accessory is attached to the phone. Once engaged, the phone 10 and an attached external accessory interface with each other via the accessory port 12. This way, the necessary accessory signals, including audio signals, serial data port signals, control signals, power leads and analog and digital grounds, that are present on corresponding accessory pins are interconnected with each other.

In this exemplary embodiment, the phone is an ACB device that includes an ACB interface implemented according to the $I^2C$-bus interface. According to the specification of the $I^2C$ bus interface, the functionality of the bus interface can be hardware or software implemented. In the hardware implementation, a dedicated integrated circuit performs the interface functions that include data transfers, arbitration, clock generation, addressing, etc. In the software implementation, a micro-controller, which is responsible for controlling other phone functions as well, performs the ACB functions. The micro-controller performs these functions by executing a suitable interface software. Because of associated overhead, the data transfer rate over the ACB interface under the software implementation is slower than the hardware implementation. Hereinafter, the devices that incorporate the hardware implementation of the ACB interface will be referred to as fast-ACB devices, and those incorporating the software implementation will be referred to as slow-ACB devices. The devices that have no ACB interface will be referred to as non-ACB devices.

As described later in detail, in an exemplary embodiment, the phone may either be a slow-ACB device or a fast-ACB device. However, the present invention's method and apparatus for operating an electronic device with an external device is equally applicable, if the phone is a non-ACB device that operates with an ACB external accessory. According to the present invention, an ACB device, which may be the phone, the slow-ACB external accessory, or the fast-ACB external accessory, initiates data communication through the accessory port over an interface bus. If data communication is established with an external device, the ACB device operates in an ACB bus interface mode, when at least one operating parameter is transferred to or from the ACB device over the interface bus. The ACB interface mode may be a fast-ACB interface mode or a slow-ACB interface mode. If, however, data communication is not established, the ACB device operates in a non-ACB interface mode, when no operating parameters are transferred to or from the ACB device over the bus. This condition arises, when operating an ACB device with a non-ACB device. By switching its interface mode based on whether bus communication is established over the interface bus, an ACB device operating according to the present invention can interface with fast-ACB, slow-ACB and non-ACB devices, without requiring any complex interface modifications as those required under the conventional interoperablity approaches.

As shown in FIG. 1, there are four types of accessories that may be connected to the phone through the accessory port. These accessories include a fast-ACB external accessory 16, a slow-ACB external accessory 18, a non-ACB external accessory 20 and a quasi-ACB external accessory 22. The quasi-ACB external accessory 22 operates in a quasi-ACB interface mode. In the quasi-ACB interface mode, the external accessory initially operates with limited ACB functionality that allows it to transfer one or more predefined operating parameters to or from an ACB device over the interface bus during an initial start up period. Subsequently, when the data transfer is completed, the quasi-ACB accessory operates in the non-ACB accessory interface mode, when no operating parameters are transferred over the bus. This way, the external accessories operating according to the quasi-ACB interface mode can be manufactured more simply without incurring the cost and complexity of incorporating the full ACB interface functionality.

Figure 2:
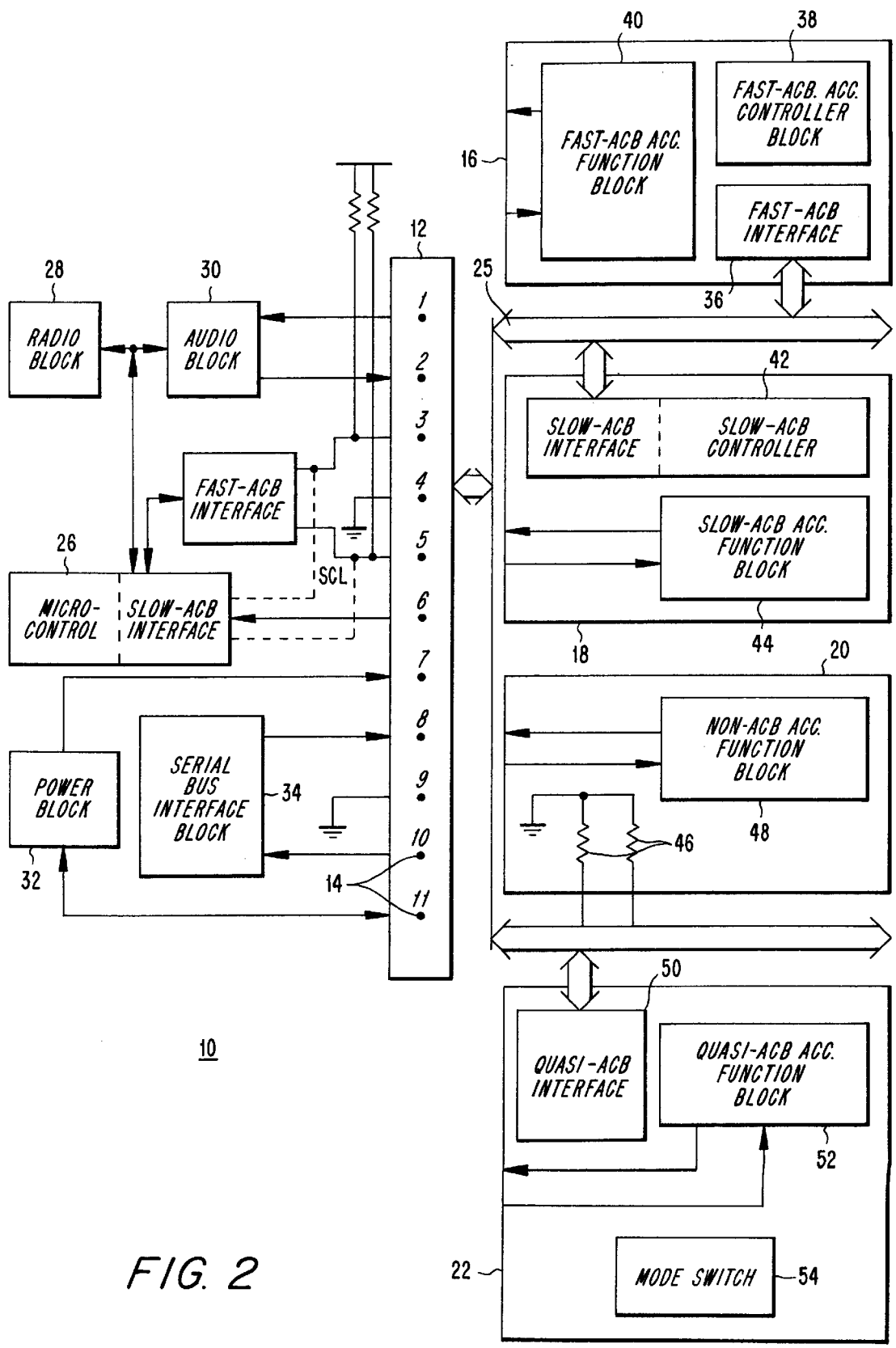
FIG. 2 is a block diagram of the phone and the external accessories of FIG. 1.

Referring to FIG. 2, a block diagrams of the phone 10 and the various external accessories that can be connected to the phone 10 are shown, to the extent necessary for understanding of the present invention. Through the accessory port 12, the phone interfaces with one or more external accessories that include the fast-ACB accessory 16, the slow-ACB accessory 18, the non-ACB accessory 20, and the quasi-ACB ACB accessory 22. All electrical interconnections between the phone 10 and the accessories 16, 18, 20, and 22 are provided through the accessory port 12. In an exemplary embodiment, the accessory 12 includes eleven contact pins 14 that provide the input or output accessory signals to and from the phone 10. TABLE 1 below identifies the functions of the accessory signals for each accessory pin 14 under a default port configuration. The TABLE 1 also specifies whether the accessory signals are input, output or input/output signals. According to TABLE 1, input signals (designated as I) are directed into the phone 10, and the output signals (designated as O) are outputted from the phone. Bidirectional signals are designated as I/O signals.

TABLE 1

| Pin | Signal | Function | I/O |
|---|---|---|---|
| 1 | AFP | Audio From Phone | 0 |
| 2 | ATP | Audio To Phone | I |
| 3 | SCL | Serial Clock Line | I/O |
| 4 | AGND | Audio Signal Ground | — |
| 5 | SDL | Serial Data Line | I/O |
| 6 | V FLASH | Flash Memory Voltage | I |
| 7 | VDD | Logic reference. Status ON | O |
| 8 | DFP | Data From Phone | O |
| 9 | DGND | Digital Ground and DC Return | — |
| 10 | DTP | Data To Phone | I |
| 11 | DCIO | DC + pole for charging of phone battery and external accessory powering | I/O |

As mentioned above, in exemplary embodiments of the present invention, the ACB interface is the $I^2C$ interface. The $I^2C$ interface defines a bidirectional data transfer over a two-line serial interface bus 25. The physical layer of the interface bus 25, which is provided on the accessory port 12, includes two open collector bus lines. These bus lines are a serial data line (SDL) and a serial clock line (SCL) on pins 3 and 5, respectively. The SCL and SDL lines are pulled to a normally high binary state by the pull-up resistors 23 included in the phone 10.

The $I^2C$-bus interface allows multiple addressed devices, which operate as masters or slaves, to be attached to the interface bus. According to the protocol, a master device is responsible for initiating data transfers over the interface bus 25 and generates the clock signals to permit such transfers. By attaching a number of ACB accessories to the bus 25, the phone can interface with a number of devices in a master-slave transfer mode. At the time of data transfers, all devices addressed by a master are considered as slaves. The master is also responsible for terminating a data transfer. The master initiates data transfers over the bus 25 by creating a START condition, and it terminates the data transfer by creating a STOP condition. The START condition is created by generating a transition from a high binary state to a low binary state on the SDL line on pin 5, while holding the SCL line on pin 3 at a high binary state. The STOP condition is created by generating a transition from a low binary state to a high binary state on the SDL line, while holding the SCL line at a high binary state. As described later, a slave device may also create a START condition that acts as an intrupt for the master device.

Data transfers over the $I^2C$ bus may be in a bit-by-bit or a byte-by-byte format. For each transfer format, the $I^2C$ protocol defines corresponding procedures for clock synchronization and bus arbitration. A master may start a data transfer only if the bus is free. By following the procedures defined in the protocol, two or more masters may arbitrate for bus access. Once access is granted, digital data may be transferred over the bus at speeds of up to 100 kbits/sec (or 400 kbits/sec in a fast mode) provided that the bus capacitance does not exceed 400 pF. Using the clock synchronization mechanism during the bit-by-bit data transfers, a device can slow down data transfers over the bus 25. By extending each clock during its low binary state, a device attached to the bus can adaptively change its data transfer rate. In this way the $I^2C$ protocol allows faster devices to communicate with slower devices over the interface bus 25.

In one embodiment of the present invention, the phone 10 is a fast-ACB device, which includes a dedicated bus interface integrated circuit 24, for implementing the ACB interface functions. One such integrated circuit is a $I^2C$ bus device from Phillips Corp that incorporates bus interface functions, such as detecting the START and STOP conditions, in dedicated bus interface circuitry.

In another embodiment, the phone 10 is a slow-ACB device, which implements the ACB interface functionality through an interface software executed by a micro-controller 26. In FIG. 2, interface software is shown as a dotted block within the micro-controller 26. Under this arrangement, the micro-controller 26 itself performs the ACB functions, including the sampling of the binary states on the SDL and SCL lines, for detecting the START and STOP conditions. Because of the overhead associated with implementing the functions of the ACB interface, a slow-ACB phone transfers data at a slower rate than the transfer rate of the fast-ACB phone. transfers data at a slower rate than the transfer rate of the fast-ACB phone. It has been determined that the slow-ACB phone can transfer data at a rate of about 100 bits/s over the interface bus.

In both the fast- and slow-ACB phones, the micro-controller 26 is programmed to control the overall operation of the phone 10, including the operation of a radio block 28, an audio block 30, a power supply block 32, and a serial bus interface block 34. As is well known, the radio block 28 is responsible for wireless communication of voice and data messages over designated radio frequency channels including the transmission and reception of such messages. The audio block 30 is responsible for processing audio signals, including coding and decoding of speech messages. The audio block 30 inputs an audio to phone (ATP) accessory signal from the external accessory on pin 1 and outputs an audio from phone (AFP) accessory signal to the external accessory on pin 2. The power supply block 32 controls the supply of power for operating the phone 10 either through an internal or an external power supply. For example, the phone 10 may be powered internally by a battery or externally by a power source in a mobile hands-free accessory, which may also be responsible for charging the battery. The power supply block 32 receives external supply, including battery charge supply, through a DCIO accessory signal pin 11. Alternatively, through the same accessory signal, the power supply block 32 can also provide supply voltage to an external accessory. The power supply block 32 also outputs a regulated reference voltage VDD accessory signal on pin 7, that, among other things, signals whether the phone is powered up or not. Through data to phone (DTP) accessory signal on pin 10 and data from phone (DFP) accessory signal on pin 8, the serial bus interface block 34 enables the phone to communicate with a data terminal either directly or through a modem. Analog ground (AGND) and digital ground (DGND) accessory signals on pins 4 and 9 provide the audio and digital returns for the phone and the external accessories. A VFLASH signal inputted on pin 6 allows an external device to upgrade a flash memory that stores the operating programs of the micro-controller 26 in a well know manner.

Similar to the fast-ACB phone, the fast-ACB external accessory 16 includes a dedicated ACB interface circuit 36 for interfacing with the phone 10 through the accessory port 12. As mentioned before, the fast-ACB external accessory 16 can transfer data at speeds of up to 10 kbits/sec. If, however, the phone 10 interfacing with the fast-ACB external accessory is a slow-ACB device, the data transfer speed is limited by the transfer speed of the slow-ACB device. The fast-ACB accessory 16, which, for example, may be an intelligent mobile hands-free accessory, also includes an accessory controller 38 for controlling the overall operation of the accessory. Through suitable circuitry, an accessory function block 40 operating under the control of the accessory controller 38 implements all of the accessory functions. In case of the mobile hands- free accessory, the accessory function block 40, for example includes audio circuitry for amplifying the AFP and ATP accessory signals, and power supply circuitry for supplying a supply voltage to the phone on pin 11. The accessory controller 38, through the dedicated ACB interface circuit 36, controls the exchange of operating parameters transferred between the phone 10 and the accessory function block 40.

Similar to the slow-ACB phone 10, the slow-ACB external accessory 18 implements the ACB interface functions by executing the bus interface software. The bus interface software, which is shown as a dotted block, is executed by a slow-ACB accessory 42 controller that controls the overall functions of the accessory 18. Through the accessory controller 42, the operating parameters may be transferred between the phone 10 and the slow-ACB external accessory 18 at about 100 bits/sec. In an exemplary embodiment, the slow-ACB external accessory 18 may be a more simple mobile hands-free accessory. By not incorporating the cost of dedicated hardware, this more simple hands-free accessory can be manufactured at a lower cost. Similar to the fast-ACB external accessory 16, the slow-ACB accessory 18 includes an accessory function block 44 that, under the control of an accessory controller 42, implements its related accessory functions and features.

The non-ACB external accessory 20, which may be a simple portable hands-free accessory, does not implement any ACB-functionality. The non-ACB external accessory 20 includes one or two grounded resistors 46 that, when attached to the accessory port, pull down the open connector terminations to create low binary states on one or both of the SDL and SCL lines on pins 3 or 4 of the accessory port 12. As described later in detail, in response to the low binary states presented at the accessory port the phone 10 can detect the presence of the non-ACB external accessory 20. The accessory features and functionality of the non-ACB accessory are implemented by corresponding circuitry in a non-ACB accessory function block 48. In the exemplary simple portable hands-free accessory, the non-ACB accessory function block may include simple audio circuitry, such as a small speaker and a microphone, that input and output audio signals via the ATP and AFP accessory signals on pins 1 and 2 of the accessory port 12.

Finally, FIG. 2 shows the block diagram of the quasi-ACB external accessory 22. As mentioned above, the quasi-ACB external accessory 22 implements only limited ACB interface functionality. Upon startup, a quasi-ACB interface 50 performs the limited ACB interface functions during the initial start up period. The limited functions implemented by the quasi-ACB interface 50 include, clock synchronization and limited data transfer functions. An accessory function block 52 implements the functional circuitry of the quasi-ACB external accessory 22.

During the initial set up period, a predefined set of operating parameters are transferred between the phone 10 and the quasi-ACB external accessory 22 over the interface bus. Once such data transfer is completed, the quasi-ACB external accessory 22 enters the non-ACB interface mode, when no operating parameters are transferred between the phone 10 and the quasi-ACB accessory device over the interface bus. In case the device interfacing with the quasi-ACB external accessory is a non-ACB device, the predefined operating parameters transferred over the bus will be ignored. Otherwise, the quasi-ACB external accessory 22 transfers the predefined operating parameters to or from an ACB device interfacing with the accessory.

An example of a quasi-ACB accessory may be a hands free accessory that during a start-up period transmits operating parameters relating to its audio functionality to the phone 10. Thereafter, the accessory operates as a non-ACB accessory with no capability to transfer operating parameters with the phone 10. Through external mode setting means, such as a mode switch 54, the quasi-ACB external accessory 22 may be reset to operate in the ACB-interface mode again, when it would attempt to initiate data communication with the phone over the interface bus 25.

Operationally, the phone 10 may interface with any one of the fast-ACB, slow-ACB, quasi-ACB and non-ACB external accessories 16, 18, 10, and 22 through an attachment provided via the accessory port 12. The external accessories are generally attached to the phone 10 on an arbitrary basis. The phone 10 may interface with the accessory devices either as a master or as a slave. By acting as a master, the phone is forced to perform periodic polling on the interface bus, to detect the presence or absence of the accessory device. Such polling function on an attached periodic basis would increase the overhead associated with interfacing with the accessory devices. Because of the associated overhead with being a master, the processing power of the micro-controller 26 within the phone 10, which controls many other functions, may be strained. Therefore, in the preferred embodiment of the invention, the ACB external accessories act as masters that initiates data communication over the interface bus. As described later in detail, the phone 10 acts as a master when a low binary state is presented on the accessory port 12, by the attachment of the non-ACB accessory device 20.

When attached to the phone 10, the fast-ACB external accessory 16, which operates as a master in a default fast-ACB interface mode, initiates data communication over the interface bus according to the I²C protocol at an initial fast data rate. By following the clock synchronization procedure set forth in the I²C interface, the external accessory can determine whether communication is established with the phone or not. If the phone 10 is a fast-ACB device, the SCL signals are synchronized quickly. In this situation, data communication is established almost immediately, and the phone 10 and the external accessory 16 both operate in the fast-ACB interface mode. In the fast-ACB interface mode, one or more operating parameters are transferred between the phone 10 and the fast-ACB accessory 16 device over the interface bus 25 at the fast initila data rate. If the phone 10 is a slow-ACB device, then the attempts by the fast-ACB external accessory 16 to establish data communication at the fast data rate would be unsuccessful. In this case, the slow-ACB phone 10 extends the low binary state of the clock signal according to the I²C protocol, to lower the data transfer speed of the fast-ACB external accessory 16 over the interface bus 25. Once communication is established at the lower speed, the phone 10 and the external accessory 16 operate in a slow-ACB interface mode, when operating parameters are transferred over the interface bus at a rate of about 100 bits/sec.

Similarly, the slow-ACB external accessory 18 interfaces with either the fast-ACB phone or slow-ACB phone as a master. When interfacing with the fast-ACB phone, the slower clock signals generated by the slow-ACB external accessory 16, which operates in its default slow-speed interface mode, adapts the faster interface speed of the phone 10 to the slower interface speed of the external accessory device 18 by extending the low binary state on the SCL line. When interfacing with the slow-ACB phone, the clock signals generated by external accessory and the phone are substantially identical, which results in an almost immediate establishment of communication therebetween. Once data communication is established with the fast-ACB phone or the slow-ACB-phone, the slow-ACB external accessory 16 and the phone 10 operate in the slow-ACB interface mode. Under this mode, operating parameters are transferred at the rate of 100 bits/sec. Althought, the master device is responsible for detecting devices attached to the bus, a slave device can initiate communication by creating a START condition over the bus. The START condition acts as an intrupt to the master device to service a service request from the slave device.

When the non-ACB external accessory 20 is attached to the phone 10, the pull-down resistors 46 ground the open collector termination at one or both of the pins 3 and 5. In response to the low binary states at one or both of these accessory pins, the phone 10 acts as a master and initiates data communication over the interface bus. The phone 10 senses the CSL line on pin 3 of the accessory port, which is pulled to a low binary state by the non-ACB external accessory, for a predefined time-out period. If the phone 10 detects no low to high transition on the SCL line within the time out period it enters a non-ACB interface mode. In the non-ACB transfer mode, no operating parameters are transferred to or from the phone 10 over the interface bus. Instead, the phone may use pre-stored default parameters for interfacing with the non-ACB accessory device. For example, if the non-ACB accessory device is a simple portable hands-free external accessory, the phone uses default operating parameters, such as attenuation and amplification parameters, when outputting and inputting the AFP and ATP signals on pins 1 and 2 of the accessory port.

When operating the phone 10 with the quasi-ACB external accessory 22, the quasi-ACB external accessory 22 initially operates in a ACB interface mode, which may be either the fast-ACB or slow-ACB interface mode. Under this arrangement, the quasi-ACB accessory 22 acts as a master to establish communication with the phone during the initial start-up period. Once communication is established the quasi-ACB external accessory 22 transfers the set of predefined operating parameters to or from the phone 10. Once the data transfer is completed according to the I²C interface, then the quasi-ACB external accessory 22 enters a non-ACB interface mode, when no operating parameters are transferred between the accessory external 20 and the phone 10.

Figure 3:
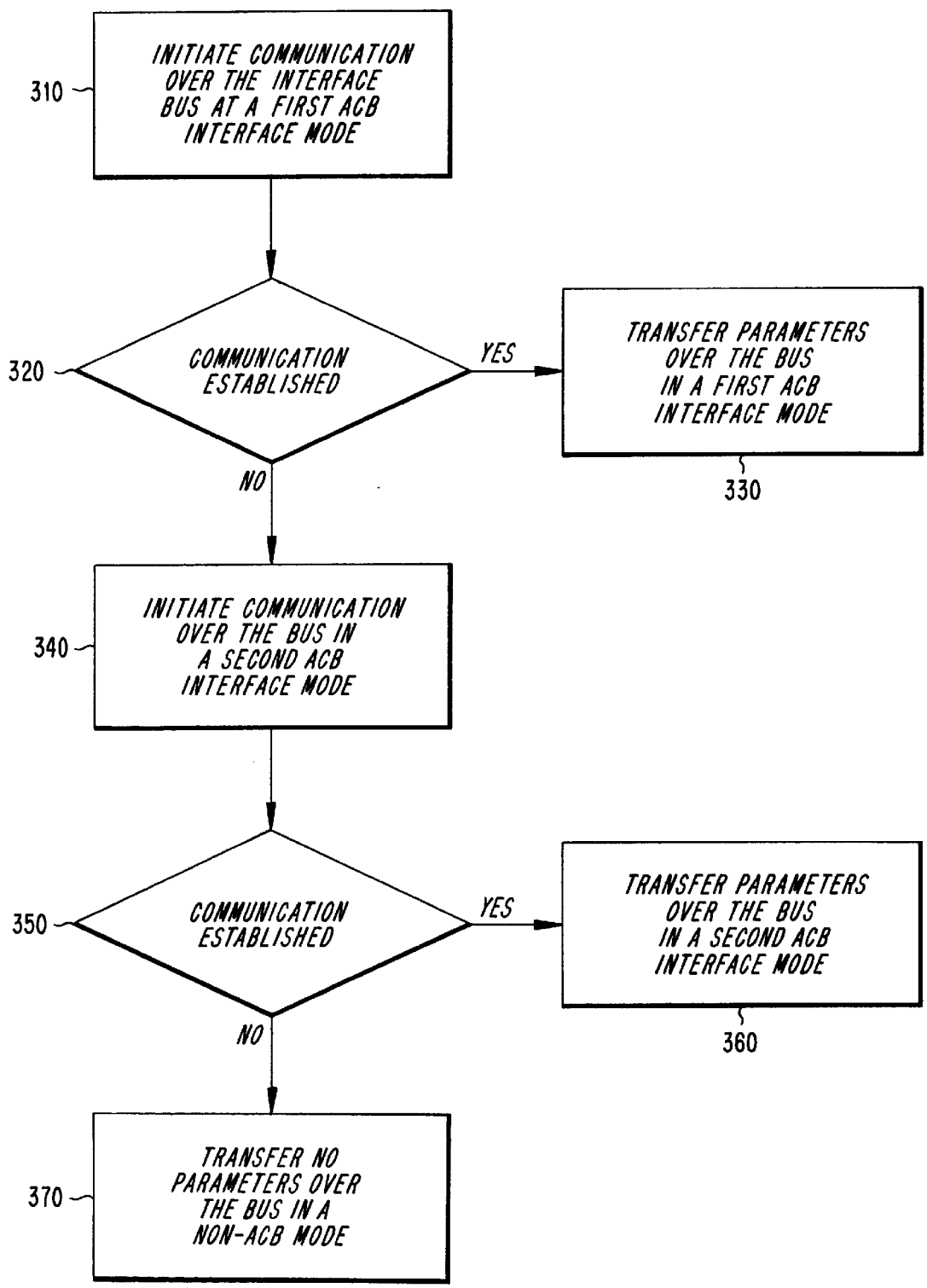
FIG. 3 is a flow chart of the steps taken to operate the electronic devices and the external accessories according to the invention.

FIG. 3 shows a flow chart of the steps taken for operating the phone 10 with various types of external accessories according to the present invention. Initially, the ACB device, which may be either one of the phone 10, the fast-, slow-ACB external accessories 16, 18, 20, or 22, initiates data communication through the accessory 12 over the interface bus 25 according to a first default ACB mode, block 310. Then, a determination is made as to whether data communication is established or not, block 320. The determination is made by sensing the SCL line on the accessory 12 for a predefined time-out period. If communication is established within the time-out period, the ACB device operates in the first ACB interface mode, when one or more operating parameters are transferred over the interface bus 25 at a first data rate, block 330. If, however, data communication is not established, the ACB device attempts to establish communication over the bus 25 in a second ACB mode, block 340. A determination is made as to whether data communication is established in the second ACB mode, block 350. If data communication is established, then the ACB device operates in the second ACB mode, when operating parameters are transferred at a second data rate, block 360. If data communication is not established in the second ACB mode, the ACB device operates in the non-ACB interface mode, when no operating parameters are transferred over the interface bus, block 370. In case no operating parameters are transferred, the ACB device can use a default operating parameter. As described above, initiating data communication includes initiating data communication using at least two different data rates.

From the foregoing description, it would be appreciated that the present invention provides a simple method and apparatus for providing interoperability between an electronic device and an external accessory. The present invention operates the ACB devices in an ACB mode if attempts at communicating over an interface bus are successful. In this way, the present invention provides a cost effective method and apparatus for interfacing complex accessories and simple accessories with the electronic device without making substantial costly and complicated modifications.

Although the invention has been described in detail with reference only to a preferred embodiment, those skilled in the art will appreciate that various modifications can be made without departing from the invention. Accordingly, the invention is defined only by the following claims which are intended to embrace all equivalents thereof.

What is claimed is:

1. An electronic device having a port for interfacing with an external device, comprising:
   a bus control interface that initiates data communication over an interface bus; and
   a controller that operates the electronic device in a first interface mode, if data communication is established with the external device, and in a second interface mode, if data communication is not established with the external device; in the first interface mode, the electronic device transferring at least one operating parameter to or from the external device over the interface bus, and in the second interface mode, the electronic device transferring no operating parameters to or from the external device over the interface bus.

2. The electronic device of claim 1, wherein the bus control interface initiates serial communication over the interface bus, and wherein the bus control interface detects a transition from a first binary state to a second binary state for determining that the data communication is established.

3. The electronic device of claim 2, wherein the control bus interface determines that the data communication is not established, when it detects no transitions after a time-out period.

4. The electronic device of claim 3, wherein the bus control interface initiates data communication in response to a signal transition presented on the port, when the external device is attached to the electronic device.

5. The electronic device of claim 1, wherein the bus interface initiates data communication using at least two different data transfer rates, and wherein the determination of whether data communication is established is made at each one of the different data transfer rates.

6. The electronic device of claim 1, wherein the controller operates the electronic device in the second interface mode, after operating it in the first interface mode.

7. The electronic device of claim 6, wherein a predefined operating parameter is transferred over the interface bus, before the electronic device operates in the second interface mode.

8. The electronic device of claim 1, wherein the electronic device uses a default operating parameter, when operating in the second interface mode.

9. A method of operating an electronic device having a port for interfacing with an external device, comprising:

initiating data communication with the external device through the port;

determining whether data communication is established with the external device;

transferring an operating parameter between the electronic device and the external device through the port, if data communication is established with the external device; and transferring no operating parameter between the electronic device and the external device, if data communication is not established with the external device.

10. The method of claim 9 further including using a default operating parameter, if no operating parameter is transferred between the electronic device and the external device.

11. The method of claim 9, wherein initiating data communication includes initiating data communication using at least two different data rates, and wherein determining whether data communication is established includes determining whether data communication is established at each one of the different data rates.

12. The method of claim 9, wherein initiating data communication includes initiating serial data communication through the port.

13. The method of claim 12, wherein determining whether data communication is established includes sensing a binary state transitions of a clock signal.

14. The method of claim 13 including determining data communication is not established, when there is no binary state transitions on the clock signal after a predefined time-out period.

15. A method of interfacing a first port of a first electronic device to a second port of a second electronic device, comprising:

initiating data communication between the first port and the second port;

determining whether data communication is established;

if established, operating the first and second electronic devices in a first interface mode that allows for the transfer of at least one operating parameter through the first and second ports;

otherwise, operating the first and second electronic devices in a second interface mode that allows for the transfer of no operating parameters.

16. The method of claim 15 further including operating at least one of the electronic devices in the second interface mode after operating it in the first interface mode.

17. The method of claim 15 further including using a default operating parameter, when operating in the second interface mode.

18. The method of claim 15, wherein initiating data communication includes initiating data communication using at least two different data rates, and wherein determining whether data communication is established includes determining whether data communication is established at each one of the different data rates.

19. The method of claim 15, wherein initiating data communication includes initiating serial data communication through the port.

20. The method of claim 19, wherein determining whether data communication is established includes sensing a binary state transitions of a clock signal.

21. The method of claim 20 including determining data communication is not established, when there is no binary state transitions on the clock signal after a predefined time-out period.

22. The method of claim 15, wherein, in the first interface mode, one of the first or the second electronic devices acts as a master device, while the other acts as a slave device.

23. The method of claim 22, wherein the master device initiates the data communication with the slave device by creating a START condition on an interface bus.

24. The method of claim 22, wherein the slaves device initiates the data communication with the master device by creating a START condition on an interface bus.

* * * * *